United States Patent
Morishita

(10) Patent No.: US 10,538,228 B2
(45) Date of Patent: Jan. 21, 2020

(54) BRAKE CONTROL DEVICE

(71) Applicant: ADVICS CO., LTD., Kariya-shi, Aichi-ken (JP)

(72) Inventor: Kazuya Morishita, Obu (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 265 days.

(21) Appl. No.: 15/542,242

(22) PCT Filed: Jan. 29, 2016

(86) PCT No.: PCT/JP2016/052627
§ 371 (c)(1),
(2) Date: Jul. 7, 2017

(87) PCT Pub. No.: WO2016/121919
PCT Pub. Date: Aug. 4, 2016

(65) Prior Publication Data
US 2017/0361815 A1   Dec. 21, 2017

(30) Foreign Application Priority Data

Jan. 30, 2015   (JP) ................................ 2015-017895

(51) Int. Cl.
*B60T 8/172*   (2006.01)
*B60T 13/74*   (2006.01)
*H02P 31/00*   (2006.01)

(52) U.S. Cl.
CPC ............ *B60T 8/172* (2013.01); *B60T 13/745* (2013.01); *H02P 31/00* (2013.01); *H02P 2205/00* (2013.01)

(58) Field of Classification Search
CPC ................................ B60T 8/172; H02P 31/00
See application file for complete search history.

(56) References Cited

U.S. PATENT DOCUMENTS 6,607,253 B1 * 8/2003 Yamamoto ............. B60T 7/042
                                                            188/181 T
2008/0097675 A1   4/2008 Konishi et al.
(Continued)

FOREIGN PATENT DOCUMENTS

CN   103321884 A   9/2013
CN   103329428 A   9/2013
(Continued)

OTHER PUBLICATIONS

International Search Report (PCT/ISA/210) dated Apr. 5, 2016, by the Japanese Patent Office as the International Searching Authority for International Application No. PCT/JP2016/052627.
(Continued)

*Primary Examiner* — Kira Nguyen
(74) *Attorney, Agent, or Firm* — Buchanan Ingersoll & Rooney PC

(57) ABSTRACT

In the case of this brake control device, for example, a drive control unit is capable of executing, in a switching manner, drive control of a motor based on an operation amount and drive control of the motor based on a stored value in a storage unit. The drive control unit continues the drive control of the motor based on the operation amount until the operation amount reaches a state satisfying a predetermined convergence condition while the drive control of the motor based on the operation amount is being executed. The storage unit stores a parameter value, which is obtained in the state in which the operation amount satisfies the predetermined convergence condition, into the storage unit as the stored value.

14 Claims, 4 Drawing Sheets

(56) References Cited

U.S. PATENT DOCUMENTS

| | | | | |
|---|---|---|---|---|
| 2012/0313338 A1* | 12/2012 | Kondo | ............... | B60G 21/0555 |
| | | | | 280/124.106 |
| 2013/0026817 A1 | 1/2013 | Morishita et al. | | |
| 2013/0251541 A1 | 9/2013 | Okamoto | | |
| 2013/0309101 A1 | 11/2013 | Uda | | |
| 2014/0182980 A1 | 7/2014 | Muramatsu et al. | | |

FOREIGN PATENT DOCUMENTS

| | | |
|---|---|---|
| CN | 103732460 A | 4/2014 |
| JP | 2008-100660 A | 5/2008 |
| JP | 2002-67932 A | 1/2013 |
| JP | 2013-6526 A | 1/2013 |
| JP | 2013-39885 A | 2/2013 |

OTHER PUBLICATIONS

Written Opinion (PCT/ISA/237) dated Apr. 5, 2016, by the Japanese Patent Office as the International Searching Authority for International Application No. PCT/JP2016/052627.

* cited by examiner

[FIG.1]
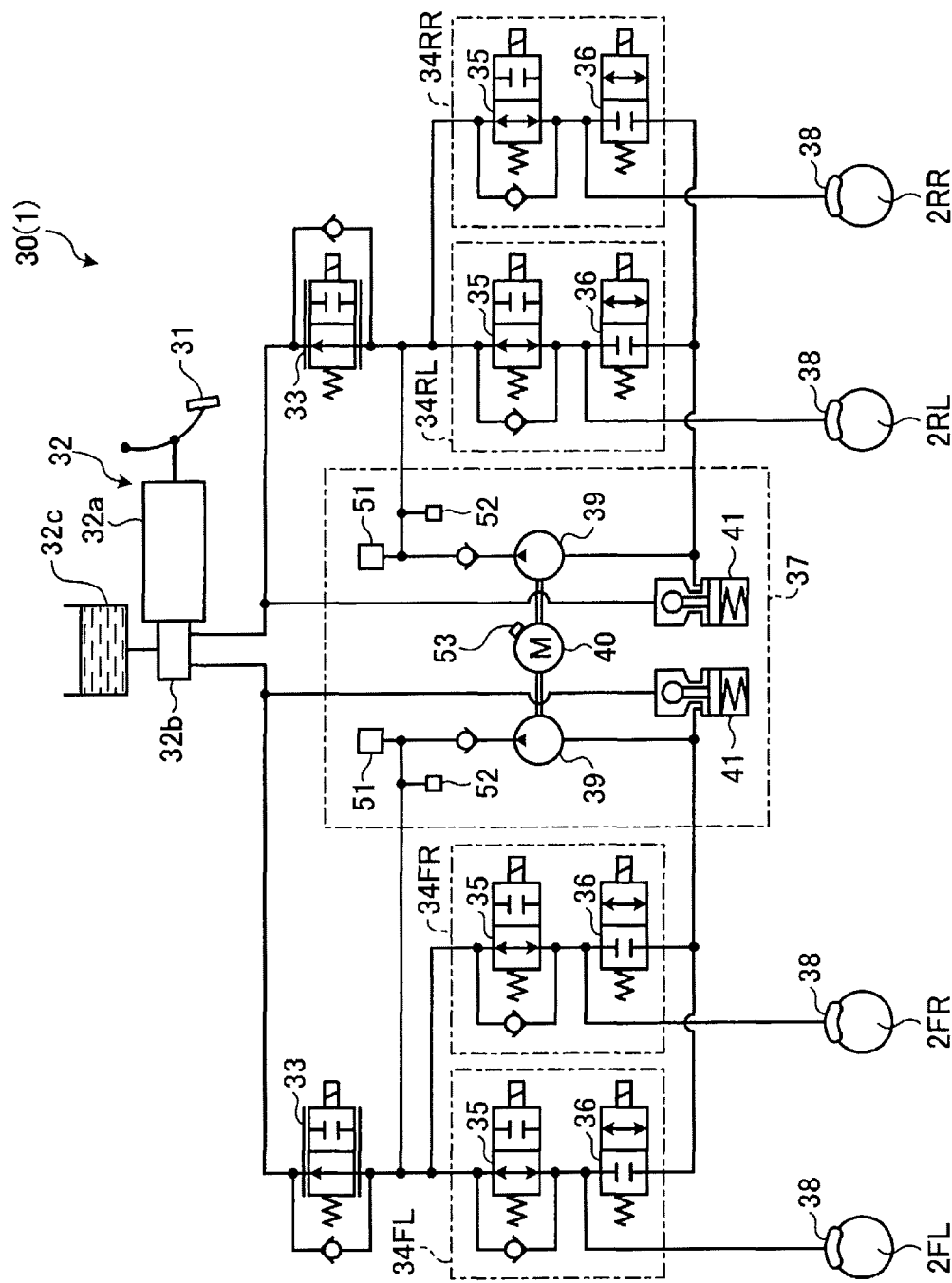

[FIG.2]
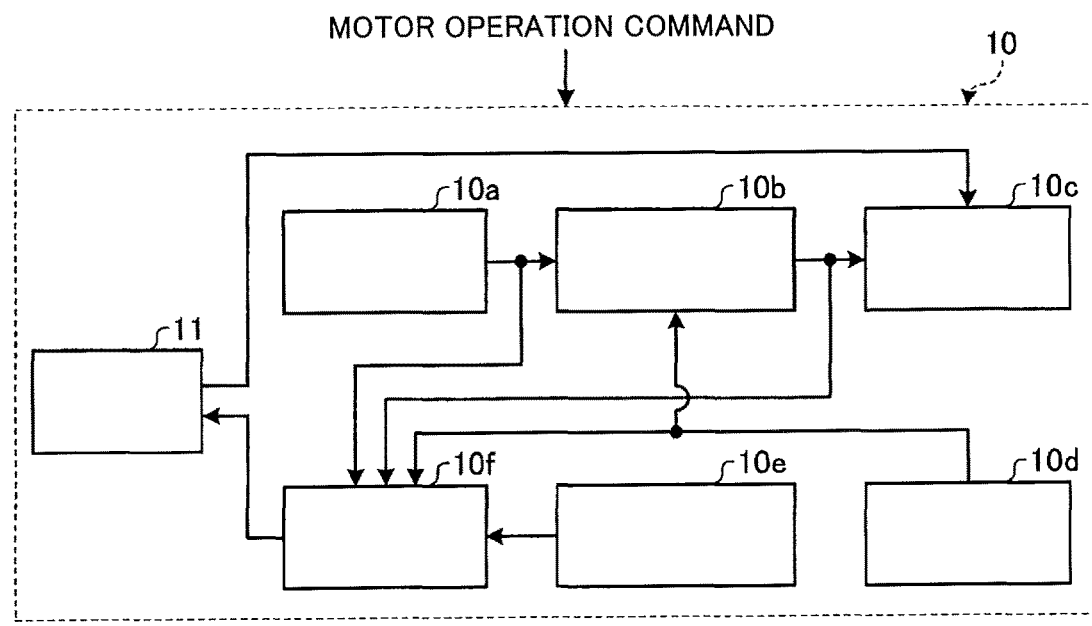
10a   TARGET VALUE SETTING UNIT
10b   OPERATION AMOUNT CALCULATION UNIT
10c   COMMAND VALUE CALCULATION UNIT
10d   ACTUAL VALUE ACQUIRING UNIT
10e   LOAD PARAMETER ACQUIRING UNIT
10f   STORAGE VALUE ACQUIRING UNIT
11    STORAGE UNIT

[FIG.3]
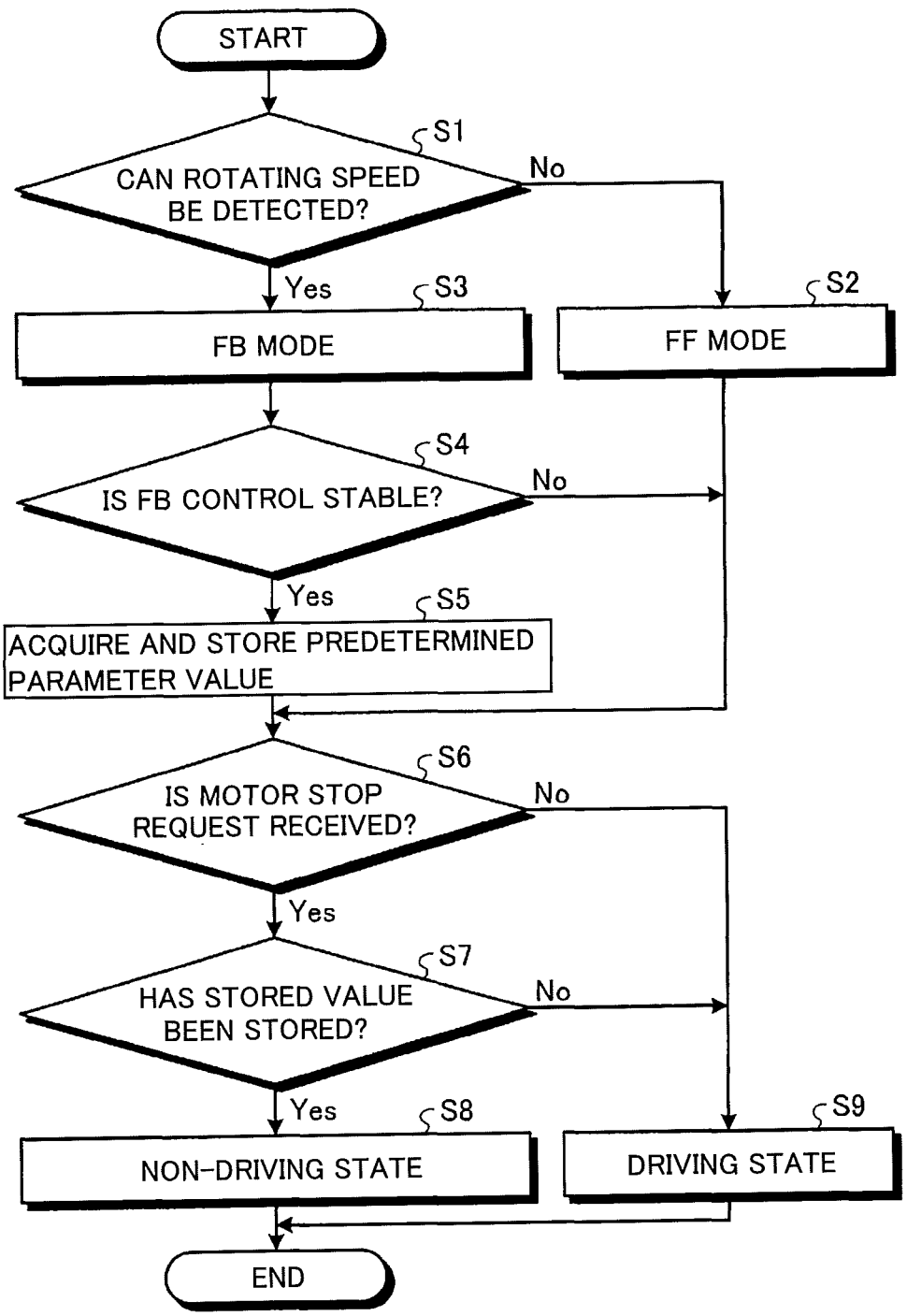

[FIG.4]
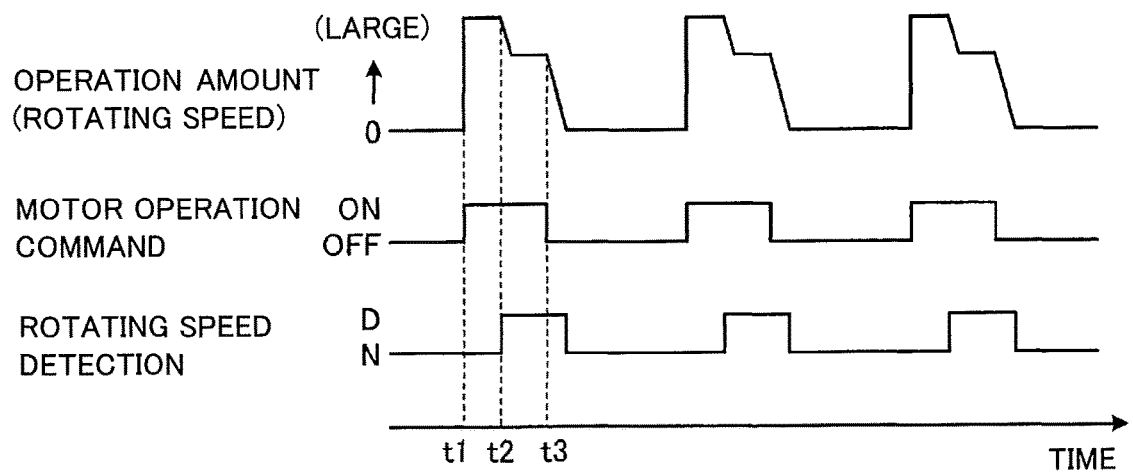
[FIG.5]
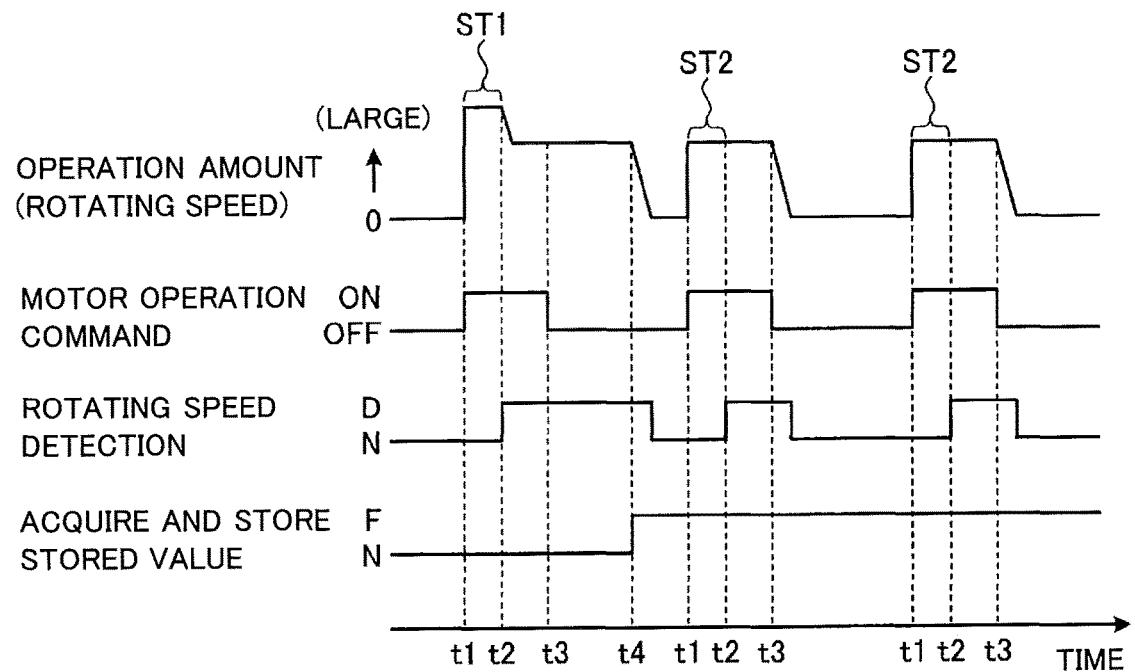

BRAKE CONTROL DEVICE

TECHNICAL FIELD

The present invention relates to a brake control device.

BACKGROUND ART

A conventional brake device controlling the rotating speed of a motor with feedback control and feedforward control has been known (for example, Patent Literature 1).

CITATION LIST

Patent Literature

Patent Literature 1: Japanese Unexamined Patent Publication No. 2013-6526

SUMMARY OF INVENTION

Technical Problems

A motor preferably has a lower rotating speed. Thus, one of the objects of the present invention is, for example, to obtain a brake control device being capable of making the rotating speed of a motor lower.

Solutions To Problems

A brake control device according to the present invention includes, for example, an operation amount calculation unit calculating an operation amount based on a deviation between a target value of a control parameter of a motor used in braking and intermittently driven such that the motor is alternatively switched into a driving state and a non-driving state and a feedback amount based on an actual value, a drive control unit being capable of switchably executing drive control of the motor based on the operation amount and drive control of the motor based on a stored value stored in a storage unit, and a stored value storing unit storing, as the stored value, a parameter value acquired based on at least one of the actual value, the feedback amount, and the operation amount in the storage unit in a state in which drive control of the motor based on the operation amount is executed, wherein the drive control unit continues the drive control of the motor based on the operation amount until a state in which the operation amount satisfies a predetermined convergence condition is established in the state in which the drive control of the motor based on the operation amount is executed, and the stored value storing unit stores, as the stored value, the parameter value acquired in a state in which the operation amount satisfies the predetermined convergence condition, in the storage unit.

According to the present invention, the drive control of the motor based on the operation amount is continued until the condition in which the operation amount calculated by the operation amount calculation unit satisfies the predetermined convergence condition is established, and, in this state, a parameter value is acquired and stored as the stored value. Thus, for example, when the drive control of the motor based on the stored value is executed, control based on a more appropriate parameter value acquired in the state in which the operation amount satisfies the predetermined convergence condition can be executed, and, consequently, a rotating speed of the motor can be controlled at a lower level.

In the brake control device, for example, the drive control unit sets the motor into a non-driving state when a time in which the motor is continuously driven is equal to or longer than a predetermined threshold value.

In the brake control device, for example, the drive control unit performs control such that a drive electric power higher than that obtained when the motor is steadily driven based on the stored value is supplied to the motor when the motor is switched from the non-driving state to the driving state.

In the brake control device, for example, the stored value storing unit updates the stored value at predetermined time intervals.

In the brake control device, for example, the shorter the time interval is set, the higher the load of the motor becomes.

BRIEF DESCRIPTION OF DRAWINGS

FIG. 1 is an illustrative and schematic diagram of a brake device controlled by a brake control device according to an embodiment.

FIG. 2 is an illustrative and schematic block diagram of the brake control device according to the embodiment.

FIG. 3 is an illustrative flow chart showing a control procedure performed by the brake control device according to the embodiment.

FIG. 4 is a diagram showing an example of a change in parameter with time in a reference brake control device.

FIG. 5 is a diagram showing an example of a change in parameter with time in the brake control device according to the embodiment.

DESCRIPTION OF EMBODIMENT

An illustrative embodiment of the present invention will be disclosed below. A configuration of the embodiment (will be described below) and an operation and a result (advantage) caused by the configuration are examples. The present invention can also be achieved by a configuration except for the configuration disclosed in the following embodiment. According to the present invention, it is assumed that at least one of various advantages (including derivative advantages) obtained by the configuration can be obtained.

As illustrated in FIG. 1, a brake device 1 (brake) of a vehicle includes a hydraulic pressure control circuit 30 giving frictional braking force (frictional braking torque) obtained by a hydraulic pressure to vehicle wheels 2FL, 2FR, 2RL, and 2RR.

The hydraulic pressure control circuit 30 includes a pressurizing unit 32 performing pressurization depending on an operation of a brake pedal 31, wheel cylinders 38 pressurizing frictional braking members to brake the vehicle wheels 2FL, 2FR, 2RL, and 2RR, pressure adjusting units 34FL, 34FR, 34RL, and 34RR adjusting pressures given to the wheel cylinders 38, and a refluxing mechanism 37 returning a fluid to an upstream side.

The pressurizing unit 32 has a vacuum booster 32a and a master cylinder 32b. The vacuum booster 32a uses a negative pressure obtained by air intake of an engine (not shown) to assist pressing-in of the master cylinder 32b with a stroke of the brake pedal 31. Two discharge ports of the master cylinder 32b are coupled to the pressure adjusting units 34FL and 34FR on the front side and the pressure adjusting unit 34RL and 34RR on the rear side through linear electromagnetic valves 33, respectively. The fluid is filled from a reservoir tank 32c.

Each of the pressure adjusting units 34FL, 34FR, 34RL, and 34RR has electromagnetic valves 35 and 36 which can be electrically switched into an open state or a closed state. The wheel cylinders 38 are coupled between the electromagnetic valves 35 and 36. The electromagnetic valve 35 is disposed between the wheel cylinders 38 and the linear electromagnetic valves 33, and the electromagnetic valve 36 is disposed between the wheel cylinder 38 and a reservoir 41. Opening/closing controls of the electromagnetic valves 35 and 36 by a control unit (not shown) allow the pressures of the wheel cylinders 38 to be increased, maintained, or reduced.

The refluxing mechanism 37 includes the reservoirs 41 and pumps 39 which are disposed on the front side and the rear side and a motor 40 which rotates the pumps 39 on the front and rear sides to transport the fluid to the upstream side.

In the hydraulic pressure control circuit 30, a sensor 51 detecting a fluid pressure, a sensor 52 detecting the temperature of the fluid, a sensor 53 detecting the temperature of the motor 40, and the like are disposed.

A control device 10 (brake control device) according to the embodiment executes the control of the motor 40. The motor 40 is intermittently driven by the control device 10. In this manner, an inconvenient event based on continuous drive can be suppressed. The motor 40 is an example of a target to be controlled by the control device 10. The control device 10 partially configures, for example, a brake control device (brake ECU). The control device 10 may be integrated with another part of the brake control device, or may be configured independently of the other part.

In the embodiment, the control device 10 intermittently drives the motor 40 such that the driving state and the non-driving state are alternatively switched. In this manner, an inconvenient event such as heat generation or deterioration of parts caused by continuous driving of the motor 40 is easily suppressed.

As illustrated in FIG. 2, the control device 10 has a target value setting unit 10a, an operation amount calculation unit 10b, a command value calculation unit 10c, an actual value acquiring unit 10d, a load parameter acquiring unit 10e, a stored value acquiring unit 10f, and the like. The configuration shown in FIG. 2 is an example, and the control device 10 may have a configuration different from that shown in FIG. 2.

The target value setting unit 10a sets a target value in the control of the motor 40. The target value is, for example, a rotating speed of the motor 40. The target value may be, for example, another parameter such as a dimensionless number, a control electric power (voltage or current), or a duty ratio in PWM control (pulse width modulation). The target value need only be in a unit (dimension) which can be used in calculation at another part in the control device 10. Each part of the control device 10 may arbitrarily convert a unit.

The target value setting unit 10a can set the target value based on, for example, information (value and data) stored in a storage unit 11. The target value setting unit 10a can set the target value in accordance with a command value (for example, rotating speed) from a circuit (ECU (electronic control unit), circuit, element, or the like) different from the control device 10. The target value may be multiplied by a coefficient corresponding to the rotating speed serving as the command value.

An actual value acquiring unit 10d acquires an actual value (detected value) in the control of the motor 40. The actual value is a parameter corresponding to an actual operation of the motor 40, and is, for example, a rotating speed in the embodiment. The actual value may be, for example, a value based on the rotating speed detected based on a ripple of a drive current of the motor 40. In the embodiment, a feedback amount is an actual value itself, and the feedback amount may be a value based on the actual value, for example, a value multiplied by a gain.

The operation amount calculation unit 10b calculates an operation amount based on the target value set by at least the target value setting unit 10a and the actual value acquired from the actual value acquiring unit 10d or the feedback amount depending on the actual value.

The command value calculation unit 10c calculates a command value to drive the motor 40 based on the operation amount from the operation amount calculation unit 10b or the stored value stored in the storage unit 11. The control device 10 controls the motor 40 in the following three modes.

(1) Feedback Mode

The mode controls the motor 40 such that a deviation between the target value set by the target value setting unit 10a and the feedback amount based on the actual value acquired by the actual value acquiring unit 10d decreases, for example, comes close to 0 (zero). In the feedback mode, the command value calculation unit 10c calculates a command value based on the operation amount calculated by the operation amount calculation unit 10b. In the embodiment, when a sensor detecting a detected value serving as a source of the actual value acquired by the actual value acquiring unit 10d can detect the value at predetermined accuracy, the motor 40 is controlled in the feedback mode.

(2) Feedforward Mode

The mode controls the motor 40 based on the stored value stored in the storage unit 11 independently of the deviation between the target value and the feedback amount. In the feedforward mode, the command value calculation unit 10c calculates a command value to drive the motor 40 based on the stored value stored in the storage unit 11. When some inconvenient event may occur in the control in the feedback mode, the control in the feedforward mode is executed. In the embodiment, when the sensor detecting a detected value serving as the source of the actual value acquired by the actual value acquiring unit 10d cannot detect the value at predetermined accuracy, the motor 40 is controlled in the feedforward mode.

(3) Motor Start Mode

At the start of the motor 40, i.e., when the non-driving state is switched to the driving state, a drive electric power higher than that in a steady operation may be required. Thus, in this mode, at the start of the motor 40, in order to prevent such a situation from occurring, a drive electric power higher than that in the steady operation (steady drive) is supplied to the motor 40. The motor start mode may be included in the aspect of the feedforward mode.

For example, when the rotating speed of the motor 40 is detected based on a ripple of the drive current, required detection accuracy of the rotating speed is hard to be obtained immediately after the motor 40 is started or in a certain time after the start of the motor 40, and control may be difficult in the feedback mode. With respect to this point, according to the embodiment, the feedforward mode and the motor start mode are set. Since control is performed in feedforward mode when the predetermined detection accuracy cannot be obtained, stabler control of the motor 40 is easily achieved. The feedforward mode and the motor start mode are used for purposes except for the countermeasure against ripple, as a matter of course. The control device 10 according to the embodiment can be naturally applied to a case in which a rotating speed is detected based on a cause except for ripple.

In the feedback mode, the command value calculation unit 10c calculates a command value for the motor 40 corresponding to the operation amount calculated by the operation amount calculation unit 10b. On the other hand, the command value calculation unit 10c, in the feedforward mode, calculates a command value based on the stored value acquired from the storage unit 11. For example, when the stored value and the operation amount are set in the same dimension, the command value calculation unit 10c directly uses the stored value to make it possible to perform the same calculation or control as that for the operation amount in the feedback mode. The driving state and the non-driving state of the motor 40 are switched depending on the command value from the command value calculation unit 10c, and the driving state of the motor 40 changes depending on the command value from the command value calculation unit 10c. The command value calculation unit 10c is an example of a drive control unit.

The stored value acquiring unit 10f acquires the value of a predetermined parameter (second parameter) when control is performed in the feedback mode and when a predetermined stable state (convergent state) is set. The predetermined parameter value need only be a value which can reproduce an operation amount in a feedback state, for example, may be one of the actual value, the feedback amount, and the operation amount, or may be a value calculated based on the value, for example, a value to which a certain margin is added or the like. The predetermined parameter mentioned here may be the actual value, a physical value (dimension) equal to the feedback amount, or a physical value (dimension) equal to the operation amount. The stored value is a rotating speed, for example. A first threshold value is arbitrarily set in accordance with a state in which a deviation is converged.

The stored value acquiring unit 10f stores the acquired value in the storage unit 11 as a stored value. The stored value is used when the driving state of the motor 40 obtained when the stored value is acquired ends and the motor 40 is set in the driving state. More specifically, the stored value is used in the driving state after the value is stored when the motor 40 is intermittently driven. The stored value may be used in control when the rotating speed of the motor 40 is not easily obtained in the current driving state (driving state in which the stored value is acquired and stored). The stored value acquiring unit 10f is an example of the stored value storing unit.

A load parameter acquiring unit 10e acquires a predetermined parameter value corresponding to a load of the motor 40. The parameter value acquired here is used to set (update) an update interval (time interval) of a stored value obtained by the stored value acquiring unit 10f. The parameter value is, for example, a parameter depending on a change in load of the pump 39 driven by the motor 40, more specifically, a pressure on the discharge side of the pump 39 detected by the sensor 51, a temperature of fluid detected by the sensor 52, a detected value such as the temperature of the motor 40 (internal temperature or external temperature), or a value corresponding to these values, for example, a value being in proportion to these values. The parameter is not limited to these values, and the parameter may be, for example, a parameter detected by a sensor disposed at a position different from those of the sensors 51 to 53 or another parameter such as an outdoor air temperature (environmental temperature).

The control device 10 is, for example, an ECU. The control device 10 may be incorporated in an ECU of any system mounted on a vehicle or an independent ECU. The control device 10 has a CPU (central processing unit) (not shown), a controller, a RAM (random access memory), a ROM (read only memory), a flash memory, or the like. The control device 10 executes processing according to an installed and loaded program to make it possible to achieve each function. More specifically, when the processing is executed according to the program, the control device 10 can function as the target value setting unit 10a, the operation amount calculation unit 10b, the command value calculation unit 10c, the actual value acquiring unit 10d, the load parameter acquiring unit 10e, the stored value acquiring unit 10f, and the like. In the storage unit 11, data used in calculation processes in the units, data of results of the calculation processes, and the like can be stored. At least some of the functions of the units may be achieved by hardware.

The control device 10 controls the motor 40 by a procedure illustrated in FIG. 3. The command value calculation unit 10c switches the control modes depending on whether a rotating speed is detected in the actual value acquiring unit 10d (S1). When the rotating speed cannot be detected in S1, more specifically, for example, when a fluctuation margin of the detected rotating speed in a predetermined time is larger than a predetermined threshold value (third threshold value) (NO in S1), the command value calculation unit 10c executes control in the feedforward mode, i.e., control for calculating a command value based on the stored value acquired from the storage unit 11 (S2). On the other hand, when the rotating speed can be detected, more specifically, for example, when the fluctuation margin of the detected rotating speed in the predetermined time is equal to or smaller than the predetermined threshold value (third threshold value) (Yes in S1), the command value calculation unit 10c executes control in the feedback mode, i.e., control for calculating a command value for the motor 40 corresponding to the operation amount calculated by the operation amount calculation unit 10b (S3). The condition in which "whether the detected rotating speed is a value ranging within a predetermined range for a predetermined period" mentioned here is an example of a predetermined acquiring condition. The acquiring condition is not limited to the condition described above. For example, a condition such as a condition in which "a change in detected value with time, for example, a fluctuation margin within a predetermined time, a change rate of the detected value per time, and the like is equal to or smaller than a predetermined value" may be added. The third threshold value, for example, falls within a range of a detected value which is arbitrarily set to obtain a reliable detected value at predetermined accuracy. The acquiring condition need only be able to determine whether a sensor can detect a value, and is not limited to the above condition. When the condition in which the sensor cannot secure the detection accuracy changes into the condition in which the sensor can secure the detection accuracy, according to the conditional branch in the S1, at the beginning of the control, the control in the feedforward mode (S2) is executed, and, thereafter, the control in the feedback mode (3) is executed. Feedforward is abbreviated and expressed as FF in the drawings, and feedback is abbreviated and expressed as FB in the drawings.

The stored value acquiring unit 10f acquires the value of a predetermined parameter (second parameter) when the feedback control is in a predetermined stable state (convergent state) (Yes in S4), and stores the acquired value in the storage unit 11 as a stored value (S5). With respect to the branch (determination) in S4, the stored value acquiring unit 10f (control device 10), for example, acquires a value of an operation amount (second parameter) when a fluctuation margin of the operation amount (first parameter) in the feedback mode in a predetermined time is equal to or smaller than a predetermined threshold value (second threshold value) (Yes in S4), and stores the value in the storage unit 11 as a stored value (S5). The condition in which "the fluctuation margin of the operation amount in the feedback mode in a predetermined time is equal to or smaller than the predetermined threshold value (second threshold value)" is an example of a convergence condition (stable condition). The first parameter and the second parameter are not limited to the operation amounts. The parameters may be parameters varying with time, for example, actual values, feedback amounts, deviations, or the like. The first parameter and the second parameter may be equal to each other or different from each other. The second threshold value may be arbitrarily set in accordance with a state in which the operation amount is converged. According to the above description, the stored value acquiring unit 10f can store the value of the second parameter in the storage unit 11 as a stored value when the rotating speed serving as an actual value is more reliably detected and the control in the feedback mode is stable, i.e., a predetermined convergence condition (stable condition) is satisfied with respect to the first parameter. Thus, for example, in the feedforward mode set thereafter, control can be executed based on a more appropriate stored value. Thus, for example, excessive increase of the rotating speed of the motor 40 can be suppressed. The convergence condition is not limited to the above condition, and the convergence condition may further include another condition in which the absolute value of a deviation is equal to or smaller than a predetermined threshold value (first threshold value) or the like. In this case, the convergence condition is a condition in which "in the feedback mode, the absolute value of the deviation is equal to smaller than the predetermined threshold value (first threshold value) and the fluctuation margin of the operation amount in the predetermined time is equal to or smaller than the predetermined threshold value (second threshold value)" consequently. Whether the operation amount satisfies the convergence condition may be determined by a parameter except for the operation amount, for example, another parameter such as an actual value, a feedback amount, or a deviation. In this case, the condition may be detected as a condition in which a fluctuation margin of the other parameter in a predetermined time is equal to or smaller than a corresponding threshold value.

With respect to a branch (determination) in S6, the command value calculation unit 10c (control device 10) sets the motor 40 in a driving state when the motor 40 is not requested to be stopped from another part of the brake control device or another ECU or the like different from the brake control device (No in S6) (S9). In this case, the control mode in S9 is any one of the (1) to (3).

With respect to a branch (determination) in S7, the command value calculation unit 10c (control device 10) stops driving of the motor 40, i.e., sets the motor 40 in a non-driving state by using a condition in which the stored value has been stored in the storage unit 11 as the condition (Yes in S7) when the motor 40 is requested to be stopped (No in S6) (S8). More specifically, the command value calculation unit 10c (control device 10) continues the driving of the motor 40 when the stored value has not been stored in the storage unit 11 (NO in S7) even though the motor 40 is requested to be stopped, i.e., even in a state in which the motor 40 need not be operated for an original application to discharge a hydraulic fluid (Yes in S6) (S9).

According to the control, a time in which control is performed in the feedback mode in S7 increases to make it possible to more reliably acquire the stored value. The procedure in FIG. 3 is executed in time steps. In this case, as described above, the stored value acquiring unit 10f acquires a predetermined parameter value and stores the parameter value in the storage unit 11 when the predetermined convergence condition is satisfied when the control is performed in the feedback mode. Thus, No in S7 denotes a state in which the predetermined convergence condition is not satisfied, and Yes in S7 is a state in which the predetermined convergence condition is satisfied. More specifically, it can be said that the command value calculation unit 10c continues the control in the feedback mode until the predetermined convergence condition is satisfied.

FIG. 4 is a graph showing examples of changes of a rotating speed, a motor operation command, and detection (presence/absence) of the rotating speed with time in a reference in which the stored value is not stored in the storage unit 11 because of the absence of the stored value acquiring unit 10f, for comparison with the embodiment.

In the example in FIG. 4, when the intermittent drivings of the motor 40 are started, i.e., when the motor 40 is switched from the non-driving state to the driving state, a high electric power is supplied with a margin to cope with a case in which the rotating speed is not detected or when detection accuracy of the rotating speed is low ("rotating speed detection"=N). In this manner, the rotating speed of the motor 40 becomes high. This control is continued for a time from time t1 to time t2. When the rotating speed is detected at time t2 ("rotating speed detection"=D), feedback control based on the target value and the feedback amount is started. When the motor operation command is switched from driving (ON) to stop (OFF) at time t3, the motor 40 is set in a non-driving state, i.e., the motor 40 stops. As shown in FIG. 4, even in the second or later drivings, the same control as in the first driving is performed, and the motor 40 operates in the same way in each of the drivings.

FIG. 5 is a diagram showing examples of changes of a rotating speed, a motor operation command, and rotating speed detection (presence/absence) with time in the control device 10 according to the embodiment.

Even in the example in FIG. 5, when the stored value is not stored in the storage unit 11 at the first start of the motor 40 in intermittent drivings, the same changes with time as those in FIG. 4 are obtained in a time from time t1 to time t2. This state is an example of a first state ST1. In the time from t1 to time t2, control is performed in the feedforward mode, and control is started in the feedback mode when the rotating speed is detected at time t2.

As is apparent from FIGS. 4 and 5, also in the embodiment shown in FIG. 5, the changes of the rotating speed, the motor operation command, and the rotating speed detection (presence/absence) with time at a time from time t1 to time t3 in the first driving are the same as those in the reference in FIG. 4. However, in the embodiment, even though the motor operation command changes from driving (ON) to stop (OFF) at time t3, the command value calculation unit 10c (control device 10) continues the control in the feedback mode. Thus, the operation amount calculation unit 10b outputs the same operation amount as that in the time from time t2 to time t3 even after time t3 has elapsed. This corresponds to a state in which S9 is executed when Yes is determined in S6 and No is determined in S7 in FIG. 3. More specifically, the state is a state in which the stored value acquiring unit 10f has not acquired a stored value and the stored value is not stored in the storage unit 11.

Current time reaches time t4, the stored value acquiring unit 10f acquires a stored value, and the stored value is stored in the storage unit 11. At this time, the command value calculation unit 10c (control device 10) sets the motor 40 in a non-driving state and ends the first driving of the motor 40 in the intermittent drivings (the motor 40 is stopped). This corresponds to a state in which S8 is executed when Yes is determined in S6 and Yes is determined in S7 in FIG. 3.

In the second and later drivings in intermittent drivings, at the start of the motor 40, the stored value acquired in the driving previous to the second and later driving is stored in the storage unit 11. Thus, the command value calculation unit 10c (control device 10) controls the motor 40 in the feedforward mode on the basis of the stored value. The states (environments) of the motor 40 and the vehicle do not largely change, a difference between electric powers required for the start or steady drive of the motor 40 may be considered to be small. Thus, in the second and later drivings in the embodiment, in the feedforward mode set until the rotating speed is detected in the time from time t1 to time t2, by control based on the stored value, the motor 40 is controlled such that the same state as that in the feedback mode which satisfies a predetermined condition when the stored value is acquired is established. In this manner, the motor 40 can be driven without giving a margin more than necessary to an electric power to be supplied. A state in the time from time t1 to time t2 in the second and later driving is an example of a second state ST2. With the control, the rotating speed of the motor 40 in the second state ST2 becomes (lower) smaller than the rotating speed of the motor 40 in the first state ST1.

In the second and later drivings (driving states) in intermittent drivings, when the rotating speed is detected at time t2, control is started in the feedback mode. When the motor operation command changes from driving (ON) to stop (OFF) at time t3, since the stored value has been stored in the storage unit 11, the control in the feedback mode is ended, and the motor 40 is set in a non-driving state. This corresponds to a state in which S8 is executed when Yes is determined in S6 and Yes is determined in S7 in FIG. 3.

The control device 10 controls the motor 40 in the same way as that in the second driving even in the third and later drivings. The stored value acquiring unit 10f updates the stored value stored in the storage unit 11 when a required change occurs in the states (environments) of the motor 40 or the vehicle. More specifically, for example, the stored value acquiring unit 10f updates the stored value when a difference between the parameters acquired by the load parameter acquiring unit 10e or a difference between parameters obtained when the stored value is acquired exceeds a predetermined threshold value (fourth threshold value). When the states of the motor 40 or the vehicle are changed to change the load of the motor 40, the motor 40 may be hard to be controlled by the stored value based on the operation amount in the previous driving. With respect to this point, according to the embodiment, depending on the load of the motor 40, the stored value can be updated. Thus, even though the load of the motor 40 changes, the motor 40 can be driven more reliably or more efficiently. The updating means that the old stored value becomes invalid and a new stored value becomes valid, for example, the index of the stored value may be changed depending on the new stored value, or the old stored value may be erased and the new stored value may be written.

In the embodiment, the stored value acquiring unit 10f can update the stored value at predetermined time intervals.

Furthermore, the stored value acquiring unit 10f can change the time intervals at which the stored value is updated depending on the load of the motor 40. More specifically, in the stored value acquiring unit 10f, the shorter the time interval is set, the higher the load of the motor 40 becomes.

In the first driving in intermittent drivings, after time t2, when the control in the feedback mode is unstable because of some cause, the stored value may be able to be calculated even though a relatively long time has elapsed. Thus, although not shown, in the embodiment, in order to prevent the motor 40 from being driven for a long time, when a time for which the motor 40 is continuously driven is equal to a predetermined threshold value (fifth threshold value) or exceeds the threshold value, operation amount calculation unit 10b decreases the operation amount to stop the motor 40.

The command value calculation unit 10c (control device 10) can supply an electric power higher than an electric power required for steady driving of the motor 40 to the motor 40 in a time from time t1 to time t2 for which control is performed in the feedforward mode in each driving in which the motor 40 is driven or in each driving state of the second and later drivings in the intermittent drivings. This control is a control in the motor start mode.

As described above, in the embodiment, the command value calculation unit 10c (drive control unit) continues the control in the feedback mode, i.e., the drive control of the motor 40 based on the calculated operation amount until the operation amount calculated by the operation amount calculation unit 10b satisfies the predetermined convergence condition. The stored value acquiring unit 10f acquires the value of the operation amount (second parameter) in the state in which the operation amount satisfies the predetermined convergence condition, and stores the value as a stored value in the storage unit 11. Thus, in the control in the feedforward mode, i.e., when drive control of the motor 40 based on the stored value is executed, control based on a more appropriate parameter value acquired when the predetermined convergence condition is satisfied can be executed. Thus, for example, the rotating speed of the motor 40 can be lowered.

In the embodiment, the command value calculation unit 10c (drive control unit, control device 10) sets the motor 40 into a non-driving state when a time in which the motor 40 is continuously driven is equal to or longer than a predetermined threshold value. Thus, long time driving of the motor 40 can be suppressed.

In the embodiment, for example, the command value calculation unit 10c (drive control unit, control device 10) performs control such that a drive electric power higher than that used when the motor 40 is steadily driven on the basis of the stored value when the motor is switched from the non-driving state to the driving state. Thus, for example, the motor 40 can be started more reliably or more smoothly.

In the embodiment, for example, the stored value acquiring unit 10f (stored value storing unit) updates the stored value at predetermined intervals, and the shorter the time interval is set, the higher the load of the motor 40 becomes. Thus, even though the load of the motor 40 changes, on the basis of a stored value corresponding to the change, for example, the motor 40 can be driven more reliably or more efficiently.

The embodiment of the present invention has been exemplified as described above. However, the embodiment is an example and does not intend to limit the scope of the invention. The embodiment can be effected in other various modes, and various omissions, replacements, combinations, and changes of the invention can be made without departing from the spirit and scope of the invention. The invention can be performed such that specifications (structures, types, numbers, and the like) of configurations, shapes, and the like can be arbitrarily changed. For example, the operation amount in the operation amount calculation unit need only be a parameter related to control of a motor, and is not limited to a rotating speed. What is stored in the storage unit may be, for example, an operation amount except for a stored value, a value obtained by adding a predetermined (constant) margin to the operation amount, and the like.

The invention claimed is:

1. A brake control device comprising:
an operation amount calculation unit calculating an operation amount based on a deviation between a target value of a control parameter of a motor used in braking and intermittently driven such that the motor is alternatively switched into a driving state and a non-driving state and a feedback amount based on an actual value;
a drive control unit being capable of switchably executing drive control of the motor based on the operation amount and drive control of the motor based on a stored value stored in a storage unit; and
a stored value storing unit storing, as the stored value, a parameter value acquired based on at least one of the actual value, the feedback amount, and the operation amount in the storage unit in a state in which drive control of the motor based on the operation amount is executed, wherein
the drive control unit continues the drive control of the motor based on the operation amount until a state in which the operation amount satisfies a predetermined convergence condition is established in the state in which the drive control of the motor based on the operation amount is executed, and
the stored value storing unit stores, as the stored value, the parameter value acquired in a state in which the operation amount satisfies the predetermined convergence condition.

2. The brake control device according to claim 1, wherein the drive control unit sets the motor into a non-driving state when a time in which the motor is continuously driven is equal to or longer than a predetermined threshold value.

3. The brake control device according to claim 1, wherein the drive control unit performs control such that a drive electric power higher than that obtained when the motor is steadily driven based on the stored value is supplied to the motor when the motor is switched from the non-driving state to the driving state.

4. The brake control device according to claim 2, wherein the drive control unit performs control such that a drive electric power higher than that obtained when the motor is steadily driven based on the stored value is supplied to the motor when the motor is switched from the non-driving state to the driving state.

5. The brake control device according to claim 1, wherein the stored value storing unit updates the stored value at predetermined intervals.

6. The brake control device according to claim 2, wherein the stored value storing unit updates the stored value at predetermined intervals.

7. The brake control device according to claim 3, wherein the stored value storing unit updates the stored value at predetermined intervals.

8. The brake control device according to claim 4, wherein the stored value storing unit updates the stored value at predetermined intervals.

9. The brake control device according to claim 5, wherein the shorter the time interval is set, the higher the load of the motor becomes.

10. The brake control device according to claim 6, wherein the shorter the time interval is set, the higher the load of the motor becomes.

11. The brake control device according to claim 7, wherein the shorter the time interval is set, the higher the load of the motor becomes.

12. The brake control device according to claim 8, wherein the shorter the time interval is set, the higher the load of the motor becomes.

13. A brake control device comprising:
control circuitry configured to:
calculate an operation amount based on a deviation between a target value of a control parameter of a motor used in braking and intermittently driven such that the motor is alternatively switched into a driving state and a non-driving state and a feedback amount based on an actual value;
switchably execute drive control of the motor based on the operation amount and drive control of the motor based on a stored value stored in a storage unit; and
store, as the stored value, a parameter value acquired based on at least one of the actual value, the feedback amount, and the operation amount in the storage unit in a state in which drive control of the motor based on the operation amount is executed, wherein
the control circuitry is further configured to:
continue the drive control of the motor based on the operation amount until a state in which the operation amount satisfies a predetermined convergence condition is established in the state in which the drive control of the motor based on the operation amount is executed, and
store, as the stored value, the parameter value acquired in a state in which the operation amount satisfies the predetermined convergence condition.

14. The brake control device according to claim 13, wherein the control circuitry is further configured to set the motor into a non-driving state when a time in which the motor is continuously driven is equal to or longer than a predetermined threshold value.

* * * * *